United States Patent [19]

Twerdochlib

[11] Patent Number: 4,628,196
[45] Date of Patent: Dec. 9, 1986

[54] TEMPERATURE MEASURING APPARATUS

[75] Inventor: Michael Twerdochlib, Oviedo, Fla.

[73] Assignee: Westinghouse Electric Corp., Pittsburgh, Pa.

[21] Appl. No.: 772,587

[22] Filed: Sep. 4, 1985

[51] Int. Cl.⁴ .......................... G02F 1/01; G01K 11/14
[52] U.S. Cl. ................................ 250/225; 250/231 R; 356/43; 374/161
[58] Field of Search ............... 374/152, 163, 161, 130, 374/131; 356/43, 44, 45; 250/231 SE

[56] References Cited

U.S. PATENT DOCUMENTS 3,081,399  3/1963  Schwarz .............................. 374/130
3,584,959  6/1971  Del Carlo ................. 250/231 SE X
4,053,232 10/1977  Dill ....................................... 250/225

FOREIGN PATENT DOCUMENTS 84101   1/1981  Japan ..................................... 374/161
112618  9/1981  Japan ..................................... 374/161

Primary Examiner—Daniel M. Yasich
Attorney, Agent, or Firm—D. Schron

[57] ABSTRACT

Apparatus which measures temperature in the high voltage environment of an electrical generator includes a temperature sensing element which includes a polarizing filter rotatable as a function of temperature. Light from a source is passed through the filter and the polarized light is again polarized through the use of a constantly rotating second polarizing filter behind which is a detector operable to provide an AC signal as a function of the doubly polarized light intensity. A reference beam is passed through the second rotating filter as well as a manually rotatable polarizing filter and is detected so as to provide a second AC signal. After an initialization, the AC signals are compared in phase, with the phase difference between them being a function of the temperature being measured.

9 Claims, 10 Drawing Figures

4,628,196

TEMPERATURE MEASURING APPARATUS

BACKGROUND OF THE INVENTION

1. Field of the Invention

The invention in general relates to thermometers for obtaining temperature measurements in potentially hostile environments, and particularly to opto-electrical apparatus for obtaining such measurements.

2. Description of the Prior Art

Diagnostic apparatus utilizes a plurality of sensors for monitoring various parameters of a system being diagnosed. For example, during on-line monitoring of a large electrical generator, various temperature measurements are required for use by a computer which performs the diagnostic analysis.

The measurement of the temperature of generator stator windings is important to the diagnostic process since a radical change in temperature due to a change in coil electrical properties may be indicative of an actual mechanical failure.

In view of the extremely high and varying electromagnetic fields caused by current through the windings, as well as voltages measurable in the tens of kilovolt range, temperature sensors are not placed directly on the windings but are located at some distance therefrom to obtain a temperature reading by secondary measurements of the cooling water or cooling gas normally passed through the windings. Under certain circumstances, due to the distant placement of the sensor and indirect temperature measurement, a dangerous winding condition may exist before detection is possible.

The present invention obviates the indirect method of obtaining temperature indications by allowing the sensor to be placed directly in contact with the stator windings even in view of the hostile environment.

SUMMARY OF THE INVENTION

The apparatus includes a light source and a first means for polarizing the light from the source as a function of the temperature being measured. This may be accomplished with a temperature sensing element having a bimetal or similar spring to which is coupled a first polarizing filter. Means are provided for converting the polarized light to a first AC signal and this may be accomplished with the provision of a second and constantly rotating polarizing filter behind which is positioned a detector means. Means are additionally provided for generating a polarized reference light and for converting it to a second AC signal, such means including the rotating polarizing filter as well as a manually rotatable polarizing filter for setting the relative phase of the two AC signals during an initialization process wherein the temperature sensing element is in a controlled temperature environment. The two AC signals are compared with respect to phase during operation, with the phase difference being utilized to generate a corresponding temperature indication.

DESCRIPTION OF THE PREFERRED EMBODIMENT

Figure 1:
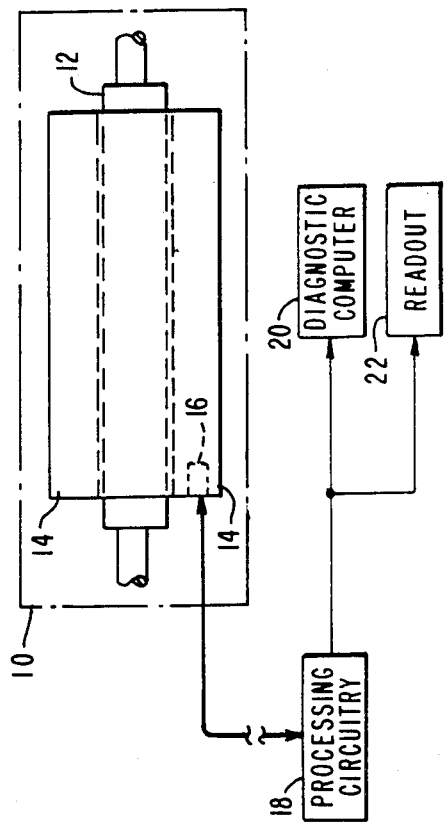
FIG. 1 is a simplified block diagram illustrating the temperature measurement of a generator stator winding.

Although the present invention is applicable to the obtaining of temperature measurements in a variety of different systems and environments it will be described by way of example with respect to an electrical generator indicated by the numeral 10 in FIG. 1.

The generator includes a rotor 12 and a stator 14 which surrounds the rotor and contains a plurality of stator windings the temperatures of which are obtained for diagnostic purposes. In accordance with the present invention a temperature sensing element 16 may be placed in direct contact with a stator winding and in conjunction with processing circuitry 18 results in an accurate temperature measurement. The temperature indication obtained by the processing circuitry 18 is provided, for example, to a diagnostic computer 20 which is also provided with a plurality of other sensor inputs so as to perform its diagnostic function. If desired, a readout 22 may also be included so as to provide an operator with a visual indication of the temperature measurement.

Figure 2:
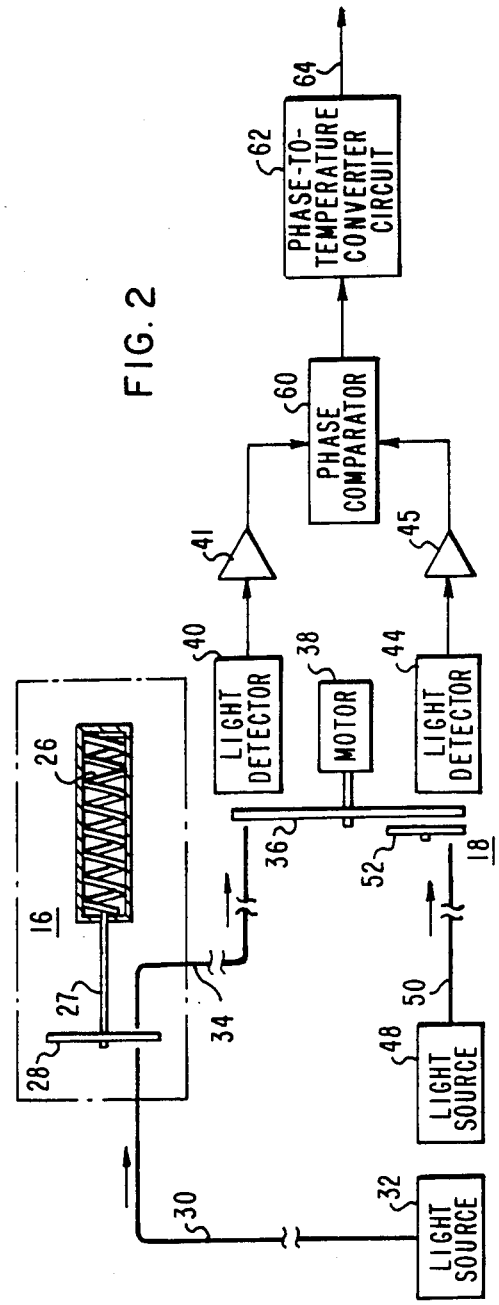
FIG. 2 is a block diagram illustrating the operation of the temperature measuring apparatus.

FIG. 2 illustrates the temperature measuring apparatus in more detail. The temperature sensing element 16 may be comprised of an elongated bimetal (or biplastic) spring member 26 to which is connected a shaft 27. This type of construction is quite common in various commercially available thermometers. Attached to the end of shaft 27 is a disc 28 of a polarizing material which will rotate as shaft 27 rotates, in response to temperature variations.

An optical conducting means such as optical fiber 30 conveys light from a light source 32 to the polarizing disc or filter 28 which functions to produce polarized light at an angular degree dependent upon the angular orientation of the filter, which in turn is a function of temperature. Light projected through the filter 28 is conveyed by means of optical fiber 34 to a second polarizing filter 36 rotatable by means of motor 38.

Light conveyed by optical fiber 34 and projected through filter 36 is intercepted by means of a light detector 40 the output signal of which is amplified by means of amplifier 41 which, for some detectors, may be an integral part thereof.

Since the light conveyed by optical fiber 34 has been polarized, with the degree of polarization being a function of temperature, detector 40 will provide an AC signal as motor 38 constantly rotates polarizing filter 36. This AC signal is compared, not in amplitude but in phase with a reference signal provided by light detector 44 and associated amplifier 45. This latter reference signal may be generated by light source 32, or as illustrated, by a separate light source 48. The reference beam from light source 48 is conveyed by means of optical fiber 50 to the detector 44, and interposed in the light path is the second, and rotating polarizing filter 36 as well as a manually rotatable polarizing filter 52.

In operation, the temperature sensing element 16 is initially placed into a thermally controlled atmosphere such as an oven set at the lowest temperature of interest to be measured. The temperature sensing element may be designed such that polarizing filter 28, coupled to shaft 27, will rotate a predetermined number of degrees for a temperature range of interest. For example, if the temperature range of interest is from 20° C. to 120° C. the temperature sensing element may be designed so that filter 28 rotates 180 angular degrees for this range, thereby providing a sensitivity of 0.56° C. per angular degree.

With initialization taking place at 20° C., and with motor 38 operational to rotate polarizing filter 36 at a constant rate, detector 40 will see a light which sinusoidally varies in intensity due to the double polarization provided by filter 28, which is stationary, and filter 36 which is rotating at a constant frequency. The detector output signal as amplified by amplifier 41 is depicted as waveform 54 in FIG. 3A. While filter 36 is constantly rotating, polarizing filter 52 is manually rotated to an angular orientation so as to cause the output signal from detector 44 to be identical in phase to that provided by detector 40 so as to simulate the arrangement of filters 28 and 36. The output waveform provided by amplifier 45 is illustrated in FIG. 3B as waveform 55 which experiences its maximum positive and negative peaks at the same time as waveform 54. It is seen therefore that both waveforms 54 and 55 are in phase for the initializing temperature, which in the example is 20° C.

After the initialization, filter 52 remains as initially set and temperature sensing device 16 is placed in position in the actual environment where the temperature measurements are to be made.

Figure 3A:
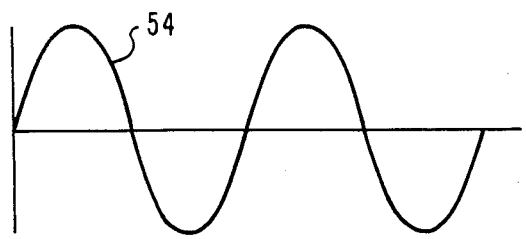
FIGS. 3A and 3B and 4A and 4B are waveforms to demonstrate the operation of the apparatus of FIG. 2.
Figure 3B:
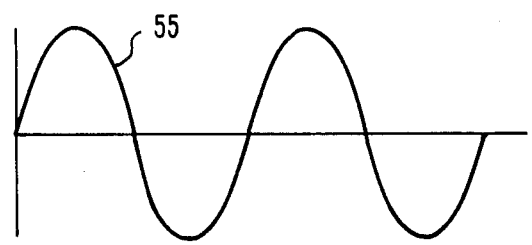
Figure 4A:
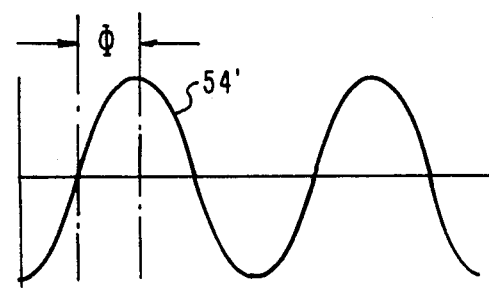
Figure 4B:
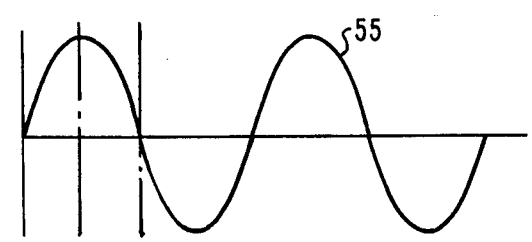

If the temperature sensed by element 16 remains at 20° C., then the waveforms of FIGS. 3A and 3B will remain in phase. As the temperature rises, bimetallic spring element 26 will cause rotation of the shaft 27 causing filter 28 to rotate as a function of temperature. The effect of this rotation is to cause the maximum positive and negative intensity peaks to occur at a different point in time as compared to the initialization. This shift in the waveform is illustrated as waveform 54′ in FIG. 4A which is shifted in phase by an amount $\Phi$ with respect to waveform 55, FIG. 4B, provided by amplifier 45.

The amount of phase difference $\Phi$ therefore, since it is dependent upon the rotation of first filter element 28, is a function of temperature measured by the temperature sensing element 16. Accordingly, a phase comparator 60 is provided to obtain an indication of the phase difference $\Phi$ and a phase-to-temperature converter circuit 62 is responsive to the results of the phase comparison to provide a temperature indicative signal on output 64. The phase-to-temperature conversion circuit may utilize any well-known curve fit equation for relating the phase shift to temperature response, or the circuitry may simply be a look-up table.

Figure 5:
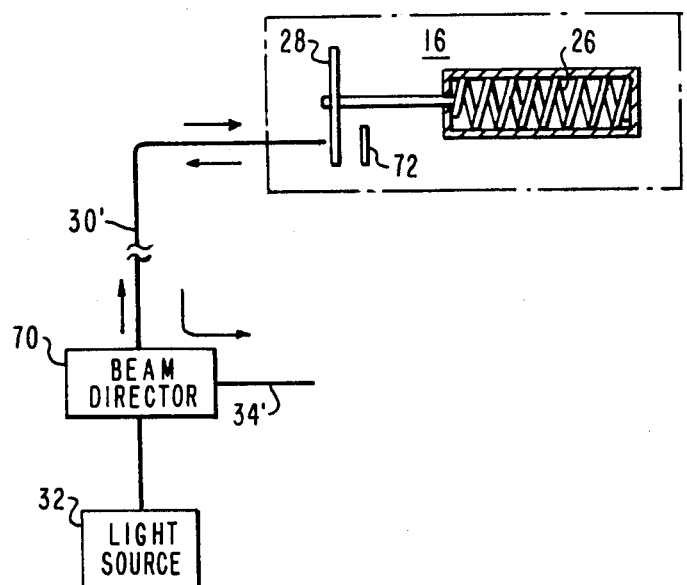
FIG. 5 illustrates an alternate embodiment of the apparatus of FIG. 2, utilizing a single optical fiber.

FIG. 5 illustrates an embodiment wherein a single optical fiber 30′ is utilized to convey light to and from the temperature sensing element 16. For this purpose, a beam director 70 is included such that the light from light source 32 is projected toward the polarizing filter 28 behind which is located a mirror 72 for directing the polarized light back through the optical fiber 30′ where it is routed by beam director 70 into optical fiber 34′, functionally corresponding to optical fiber 34 of FIG. 2.

Figure 6:
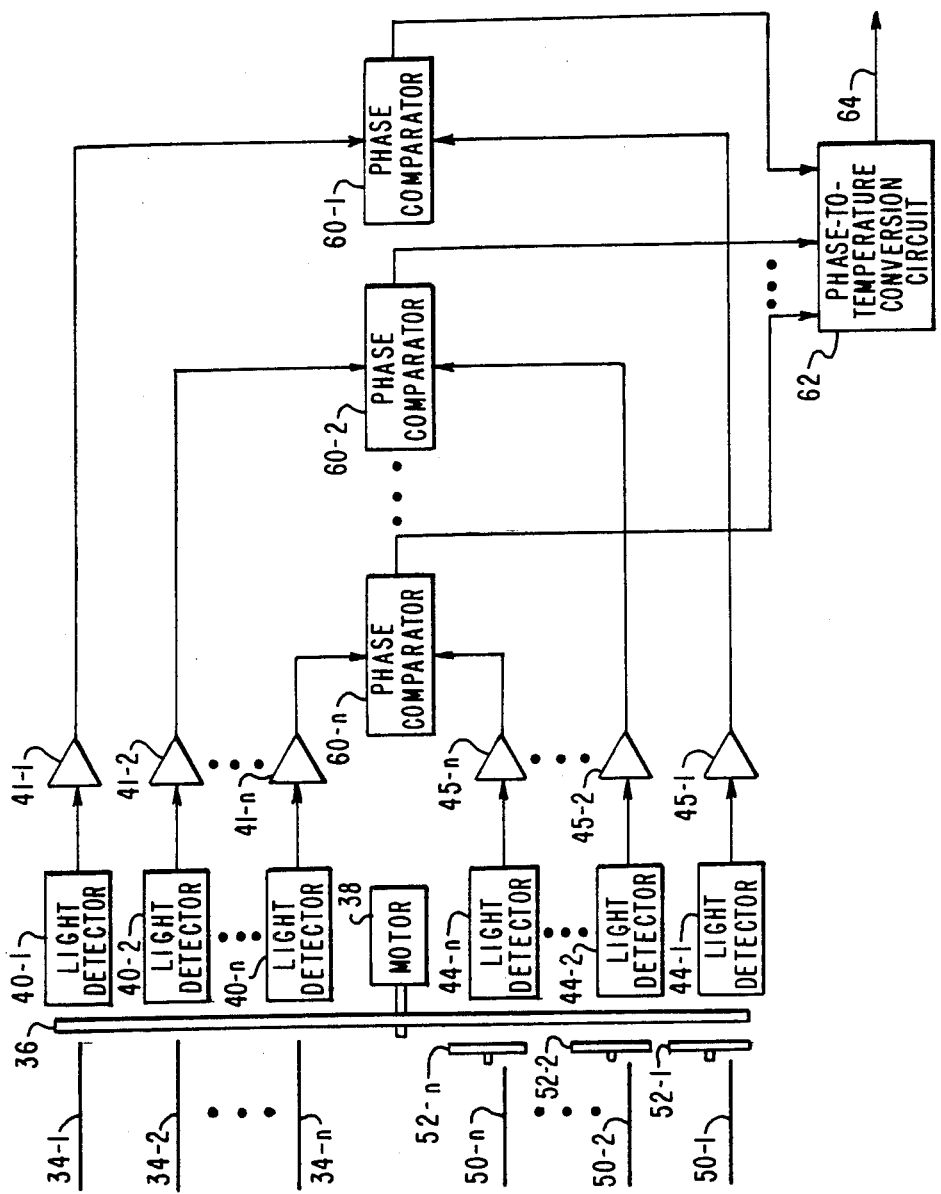
FIG. 6 illustrates an arrangement for obtaining multiple temperature indications.

The apparatus of the present invention can provide for multiple temperature indications obtained by a plurality of temperature sensors located throughout the generator, or other system being monitored. Thus, in FIG. 6, a plurality of optical fibers 34-1 to 34-n are illustrated, it being understood that each emanates from a different temperature sensing element. A corresponding number of reference beams are provided by optical fibers 50-1 to 50-n and the light therefrom is projected not only through rotating polarizing filter 36 but through individual manually rotatable polarizing filters 52-1 to 52-n.

During the initialization process the n temperature sensing elements are placed into a controlled temperature environment and each filter 52-1 to 52-n is rotated so that the output signals provided by amplifiers 41-1 and 45-1 are in phase agreement, as are the output signals provided by amplifiers 41-2 and 45-2 as well as 41-n and 45-n. The phase comparisons are made in respective phase comparison circuits 60-1 to 60-n all of which provide their output signals to conversion circuitry 62 for deriving the actual temperature indications. Alternatively, a single phase comparison circuit could be so multiplexed as to process all pairs of output signals.

Figure 7:
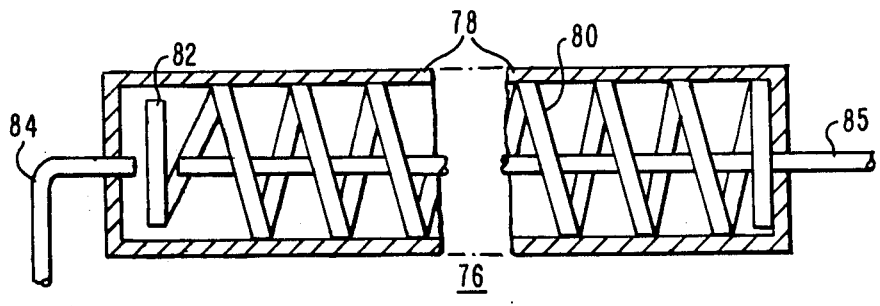
FIG. 7 illustrates an alternate construction of a temperature sensing element.

FIG. 7 illustrates a temperature sensing element 76 of a modified construction which reduces the overall size of the element. Elongated housing 78 contains a bimetal or biplastic spring member 80. Connected directly to the end of spring member 80 is a polarizing filter 82 which is rotatable as a function of temperature due to its connection to spring member 80. First and second optical fibers 84 and 85 are arranged on either side of filter 82 with one of them, optical fiber 85, being positioned within the bimetallic spring 80. One of the optical fibers is utilized for conduction of light from a light source such as optical fiber 30 in FIG. 2 while the other is used for conduction of the polarized light, such as optical fiber 34 in FIG. 2.

In situations where the temperature sensing element would be subject to excessive vibration the interior of housing 78 could be filled with a damping fluid so as to damp out any oscillations which may possibly introduce error into the temperature measurement.

Figure 8:
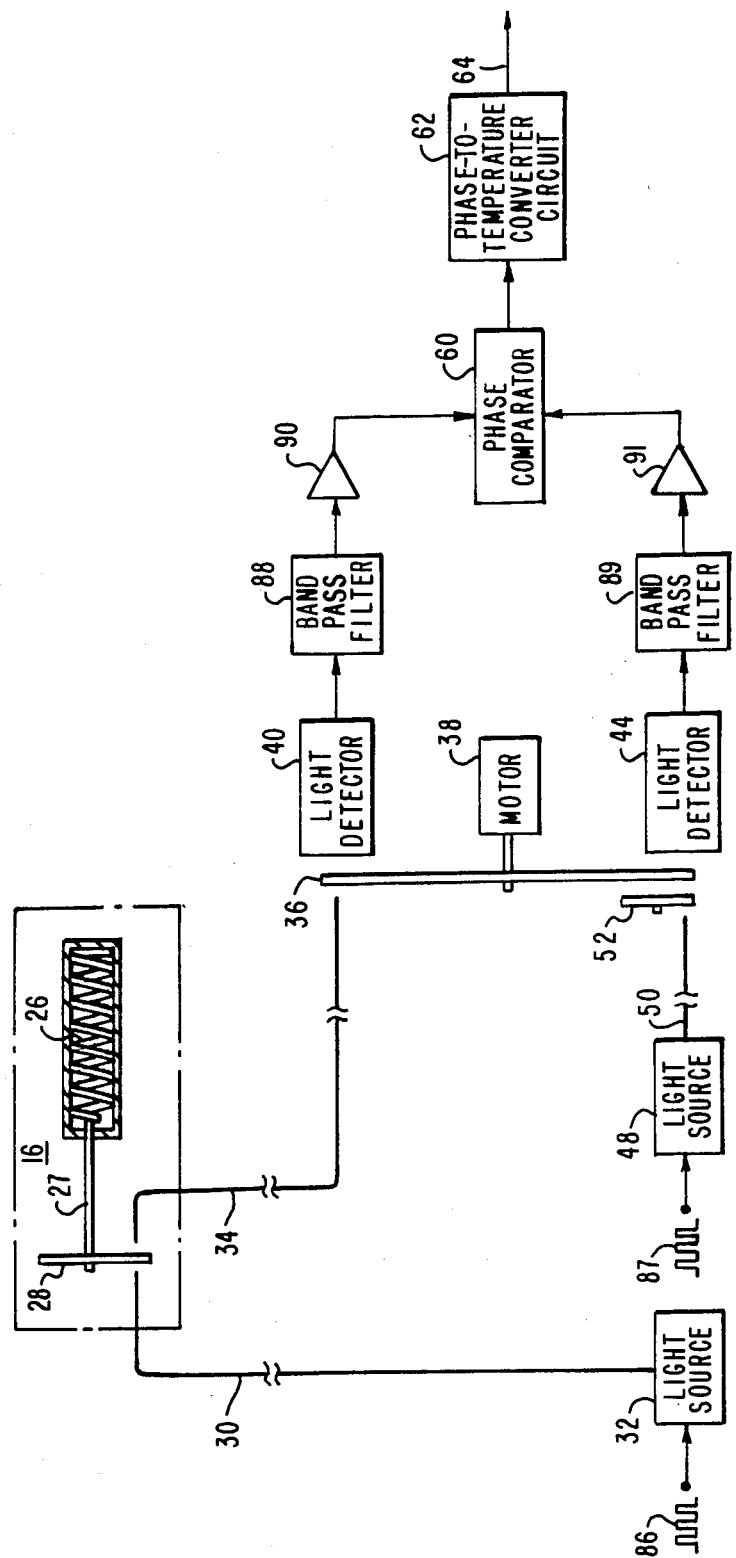
FIG. 8 illustrates another embodiment of the invention.

Greater sensitivity in the detection of the light signal can be obtained by employing a square wave to switch light sources 32 and 48 of FIG. 2 off and on at a frequency much higher than the rotational frequency of the poloroid filter 36. This embodiment is illustrated in FIG. 8 wherein square wave signals 86 and 87 are utilized to switch respective light sources 32 and 48 rapidly on and off. Narrow band pass filters 88 and 89 receiving the outputs of respective detectors 40 and 44 greatly improve the signal-to-noise ratio. Amplifiers 90 and 91 are designed not to pass the high frequency component of the signal so as to remove the high frequency modulation, thus leaving the low frequency AC signal that is used to determine temperature.

Accordingly there has been described temperature measuring apparatus which obtains temperature by the measurement of the phase displacement between two AC signals. The temperature measuring process is not dependent upon amplitude of light and accordingly if some degradation should occur in any optical path, the resulting possible decrease in light intensity would not affect the temperature measurement. The temperature sensing element is rugged, easy to install, and the apparatus although usable to measure the temperature in various types of systems, is particularly well adapted for the measurement of temperature in hostile environments. Such hostile environments include electrical equipment having high varying magnetic fields and operating voltages measurable in the tens of kilohertz region.

I claim:

1. Apparatus for determining temperature, comprising:
   (A) a temperature sensing element having a portion which rotates as a function of the temperature to which the element is exposed;
   (B) a first polarizing filter coupled to said portion for rotation therewith;
   (C) a first light detector;
   (D) a light source;
   (E) optical fiber means positioned to convey light from said source to said first polarizing filter and to said first light detector;
   (F) a rotatable, second polarizing filter interposed between said first light detector and the end of said optical fiber means conveying said light to said first light detector;
   (G) a second light detector;
   (H) means for projecting a reference light onto said second detector;
   (I) a manually rotatable polarizing filter;
   (J) said manually rotatable polarizing filter and said second polarizing filter being interposed in the light path between said means for projecting and said second detector;
   (K) means for continuously rotating said second polarizing filter so that each said detector provides respective AC signals;
   (L) means for comparing the phase difference between said AC signals; and
   (M) means for converting said phase difference to an equivalent temperature signal.

2. Apparatus according to claim 1 wherein:
   (A) said temperature sensing element includes an elongated spring member of a construction which rotates as a function of temperature; and which includes
   (B) a shaft member coupled to said spring member; and
   (C) said first polarizing filter being connected to said shaft portion.

3. Apparatus according to claim 1 wherein:
   (A) said optical fiber means includes a first optical fiber positioned on one side of said first polarizing filter and a second optical fiber for conveying the light projected through said first polarizing filter to said first light detector.

4. Apparatus according to claim 1 wherein:
   (A) said optical fiber means is comprised of a single optical fiber; and which includes
   (B) a mirror positioned behind said first polarizing filter to redirect the polarized light back down said single optical fiber; and
   (C) a beam director for directing the reflected beam in said single optical fiber to said first light detector.

5. Apparatus according to claim 1 wherein:
   (A) said AC signals are sinusoidal signals.

6. Apparatus according to claim 1 wherein:
   (A) said manually rotatable polarizing filter is interposed in the light path between said means for projecting and said second polarizing filter.

7. Apparatus according to claim 1 wherein:
   (A) said means for projecting a reference light onto said second detector includes a separate, and second light source.

8. Apparatus according to claim 1 wherein:
   (A) said temperature sensing element includes a spirally arranged elongated spring member; and which includes,
   (B) a housing containing said spring member;
   (C) said spring member being rotatable about said axis as a function of the temperature to which it is exposed;
   (D) said first polarizing filter being coupled to the end of said spring member for rotation therewith and having a maximum dimension in the order of the diameter of said housing.

9. Apparatus according to claim 8 wherein:
   (A) said optical fiber means includes an optical fiber positioned within said housing.

* * * * *